United States Patent [19]

Arvedi et al.

[11] Patent Number: 5,578,233
[45] Date of Patent: Nov. 26, 1996

[54] INDUCTION FURNACE WITH LINEAR FLUX CONCENTRATOR

[75] Inventors: Giovanni Arvedi, Via Mercatello 26, Cremona, Italy; Gosio Giovanni, Cremona, Italy

[73] Assignee: Giovanni Arvedi, Cremona, Italy

[21] Appl. No.: 244,290

[22] PCT Filed: Dec. 17, 1992

[86] PCT No.: PCT/IT92/00164

§ 371 Date: May 23, 1994

§ 102(e) Date: May 23, 1994

[87] PCT Pub. No.: WO93/12628

PCT Pub. Date: Jun. 24, 1993

[30] Foreign Application Priority Data

Dec. 18, 1991 [IT] Italy ................................. FI91A0301

[51] Int. Cl.⁶ ............................................. H05B 6/10
[52] U.S. Cl. ............................ 219/645; 219/672; 219/647
[58] Field of Search ................................. 219/645, 650, 219/670, 671, 673, 662, 674, 646, 745, 608, 611, 647, 672

[56] References Cited

U.S. PATENT DOCUMENTS

| | | | |
|---|---|---|---|
| 2,452,197 | 10/1948 | Kennedy | 219/660 |
| 3,444,346 | 5/1969 | Russell et al. | 219/645 |
| 3,562,470 | 2/1971 | Bobart | 219/645 |
| 4,185,183 | 1/1980 | Kamimoto | 219/645 |
| 4,357,512 | 11/1982 | Nishimoto et al. | 219/608 |
| 4,778,971 | 10/1988 | Sakimoto et al. | 219/645 |
| 4,795,872 | 1/1989 | Hagisawa et al. | 219/645 |
| 4,891,484 | 1/1990 | Waggott et al. | 219/645 |
| 5,179,258 | 1/1993 | Arvedi et al. | 219/645 |

FOREIGN PATENT DOCUMENTS

| | | |
|---|---|---|
| 0243340 | 3/1987 | European Pat. Off. . |
| 2121260 | 12/1983 | United Kingdom . |

*Primary Examiner*—Tu Hoang
*Attorney, Agent, or Firm*—Panitch Schwarze Jacobs & Nadel, P.C.

[57] ABSTRACT

An induction furnace for homogeneously heating flat steel products fed therethrough in a continuous line in a predetermined feeding direction includes a succession of heating assemblies and pairs of rollers placed between the heating assemblies for supporting and moving the flat products in the feeding direction. Each heating assembly has a narrow induction coil fed by a separate frequency converter and a linear flux concentrator. The coil extends transverse to the feeding direction. The size of the coil in the feeding direction of the flat products is 350 mm. or less. The flux concentrator is in proximity of the coil and extends along the longitudinal orientation of the coil. The flux concentrator has ends, an upper portion and a lower portion. The upper and lower portions are joined at each of the ends, and establish a central gap therebetween for the flat products to pass therethrough. The gap extends through the heating assembly in a direction transverse to the longitudinal orientation of the coil. The upper and lower portions are each formed as a packet of generally C-shaped magnetic sheet irons arranged side by side and directed at right angles to both a longitudinal orientation of the coil and a plane defined by the flat products to be heated. The sheet irons are oriented parallel to the feed direction. The upper and lower portions facing each other and house the inductor coil in the gap.

4 Claims, 3 Drawing Sheets

INDUCTION FURNACE WITH LINEAR FLUX CONCENTRATOR

BACKGROUND OF THE INVENTION

1. Field of the Invention

The present invention relates to an improved induction furnace for heating or re-heating flat products of steel industry, particularly to re-establish a homogeneous temperature, suitable to rolling thin steel slabs.

2. Description of the Prior Art

It is known from the Italian patent application No. 20534 A/89, corresponding to the International publication WO 90/14742, an induction furnace comprising an array of coils, which are separately fed by one or more frequency converters and crossed in succession by the strip being supported and caused to move forward by pairs of rollers between each coil and the subsequent one, wherein flux concentrator devices are provided, mounted in pairs at the ends of each inductor, at least on an upper or lower side, with respect to the plane defined by the strip itself.

Although this solution gives best results, as it allows for the first time to exploit satisfactorily the induction heating in connection with longitudinal flat products, whereas the magnetic flux was previously mainly directed such as to cross transversely the strip in the thickness direction, with poor results but for the thermal treatment of the edges only, however some inconveniences have been experienced, mainly due to the great leakage of magnetic flux which, as it closes at the outside of the strip, crosses the structural metal parts of the apparatus, thus causing an undue heating thereof in spite of the presence of lateral flux concentrators, possibly movable.

Previously, with longer inductors (along the longitudinal size of the product to be heated), as it was possible for thicker products, the possible utilization of concentrators would be useless, since the little improvement in the efficiency and reduction of leakage would not be worth in comparison with the increase of costs. With a short inductor, as necessarily adopted in connection with flat products such as thin slabs, also the presence of lateral flux concentrators according to the above-mentioned previous patent does not solve the problem of flux leakage and leads to relatively low efficiencies, e.g. of 0.6 or less, when considering the ratio between power entering the flat product to be heated, including losses due e.g. to radiation, and supplied active power.

As a matter of fact, the longitudinal size of coils cannot be made too great, since to keep a reduced value of the space between two subsequent coils, above which the thin product could not be fed forward in a suitable way, a reduced diameter of the rollers would result, which is to be avoided in order not to have a too small bending radius, with consequent stumbling of the flat product and problems of heat transmission. An attempt was then made to modify the mechanical parts to overcome the drawbacks caused by the flux leakage. A solution of this type requires providing rollers coated with refractory material, to prevent sparkling and consequent "dotting" on the strip, and/or making not solid rollers, but formed of isolated sectors to hinder the generation of eddy currents, or finally mounting the rollers on separate pillars, such as of concrete. This way a structure would be obtained not only more complex and costly, but also less solid and compact, certainly not so suitable to this type of processing and steel industry environment.

SUMMARY OF THE INVENTION

Surprisingly it has now been found that by the use of a flux concentrator extending along the whole coil, being formed e.g. of two lamination packets having a substantially C-shaped cross section, such as to surround the induction coil at both upper and lower side with respect to the plane defined by the product to be heated, whereby only a passage for the product itself is left free, the flux leakage decreases by at least 90% and the above-mentioned efficiency may rise up to about 0.7 and more. In addition to energy saving, a mechanical structure of merely traditional construction can be obtained, i.e. sound and adapted to the steel manufacturing field, where on the contrary the induction furnaces have been usually considered in the past as something extraneous, not integrated in the solid structures adapted in that field.

BRIEF DESCRIPTION OF THE DRAWINGS

These and additional objects, advantages and features of the improved induction furnace according to the invention will become apparent to those skilled in the art from the following detailed description of a preferred embodiment thereof, given by way of non-limiting example with reference to the annexed drawings in which.

DESCRIPTION OF THE PREFERRED EMBODIMENT

Figure 1:
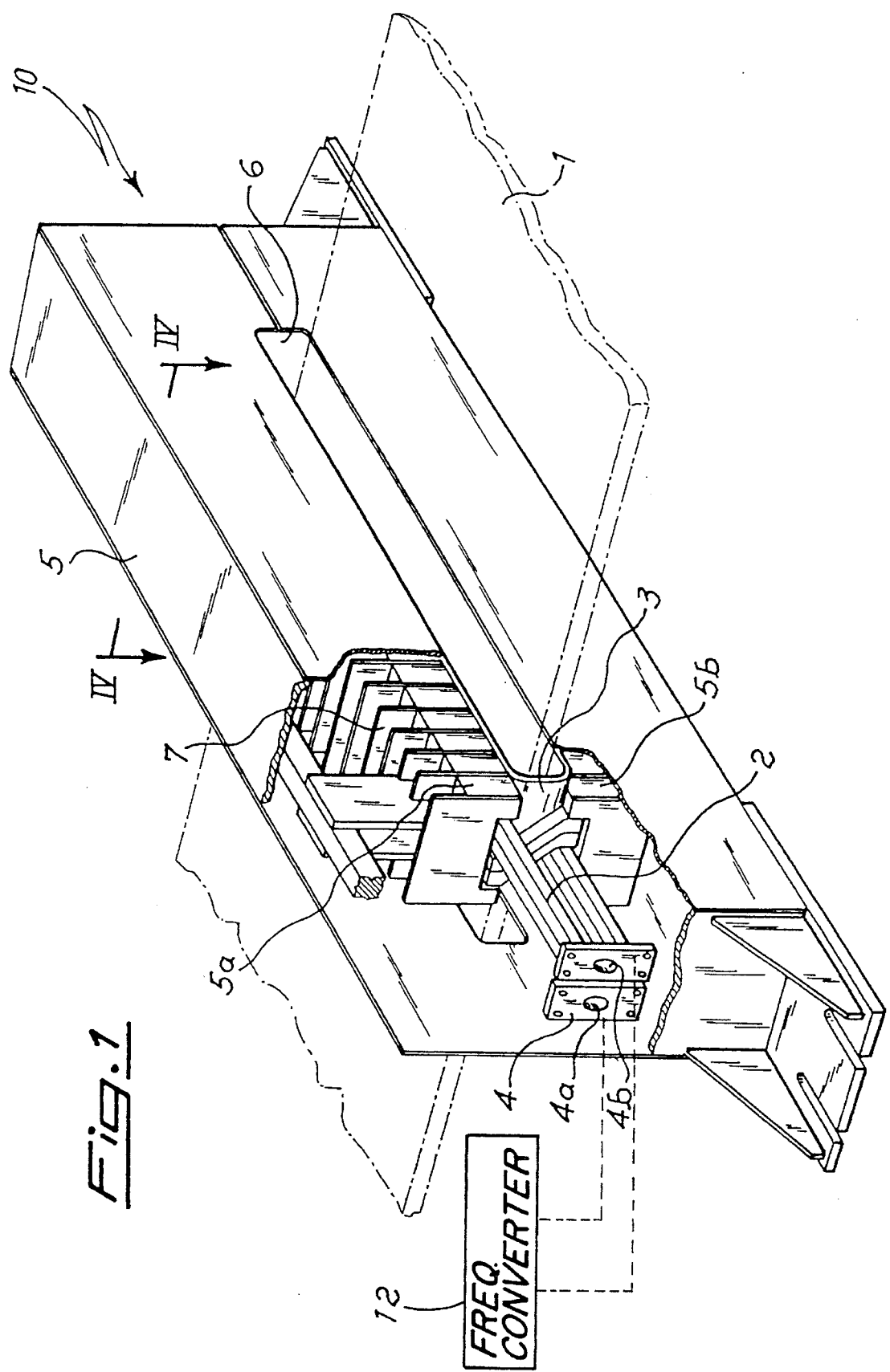
FIG. 1 shows, in a perspective view, partially broken-away, a heating element or coil of the furnace.
Figure 2:
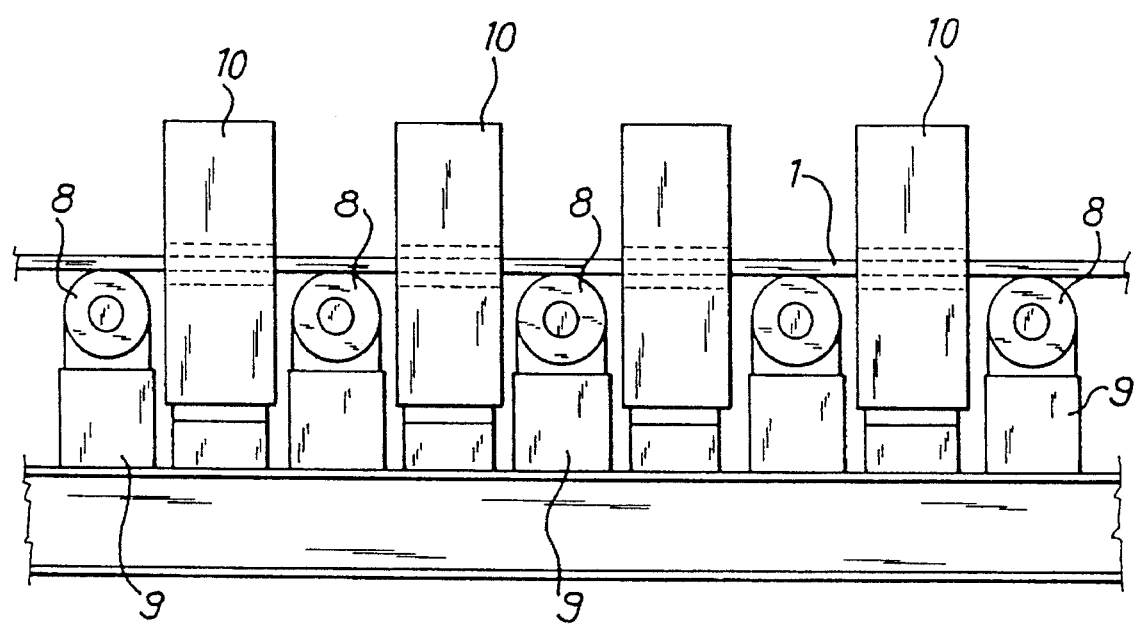
FIG. 2 shows a schematic side view of an induction furnace of the present invention, formed of four heating elements of FIG. 1.

Only one heating element 10 of the furnace according to the invention has been schematically illustrated in FIG. 1, in the direction of forward movement of a strip 1, which is comprised between two pairs of rollers 8 mounted on supports 9, as represented in FIG. 2, and is formed of a coil 2 having a substantially rectangular cross section and being embedded in a refractory block 3. In the drawing an end 4 of the coil can be seen, which provides the electrical connection with a power source (frequency converter) 12 through suitable conductors or "bus bars", and with a cooling pipe network. There can be seen in fact holes 4a, 4b, inner and coaxial with the coil, respectively of inlet and outlet of cooling water.

Figure 4:
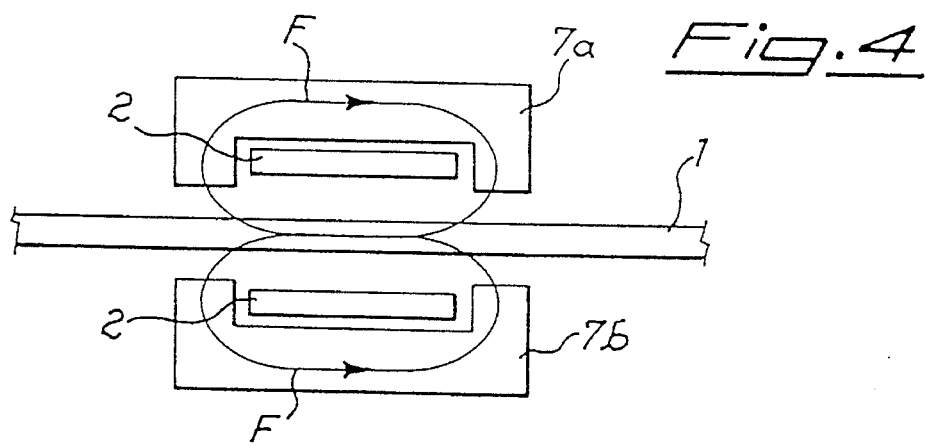
FIG. 4 shows a schematic sectional view along line IV—IV of FIG. 1 pointing out the path of magnetic flux in the laminations 7 of flux concentrators according to the present invention.

While leaving out the description of other structural or auxiliary parts which are well known in the art, according to the present invention FIG. 1 shows the flux concentrator 5 completely enclosing coil 2 as only a gap 6 is left free, between two arms of the loop formed by the coil, which is sufficient for the strip 1 passing therethrough. Flux concentrator 5 is formed of the assembly of two magnetic lamination packets, i.e. an upper one 5a and a lower one 5b, matching together at the ends, whereby coil 2 is completely surrounded while central gap 6 is ketp free. As is better shown for the upper packet 5a, which is represented with a partially broken away housing, laminations or sheet iron 7 forming the same are directed, all parallel each other, at right angles with respect to the plane defined by strip 1 and the respective upper or lower loop of coil 2, thus enhancing, with a high magnetic permeability, the flux concentration at the inside thereof. Upon longitudinally crossing a length of strip 1, as shown in FIG. 4, the flux would have the tendency to close its path at the outside, by linking through the metal structural parts of the furnace itself. Actually the flux leakage flows circularly within each lamination thus closing the magnetic circuit, but at the same time preventing or reducing to the minimum the generation of induced currents in a crosswise direction owing to the high resistance provided by the lamination packet when induced or eddy currents pass from a sheet iron to another.

Figure 3A:
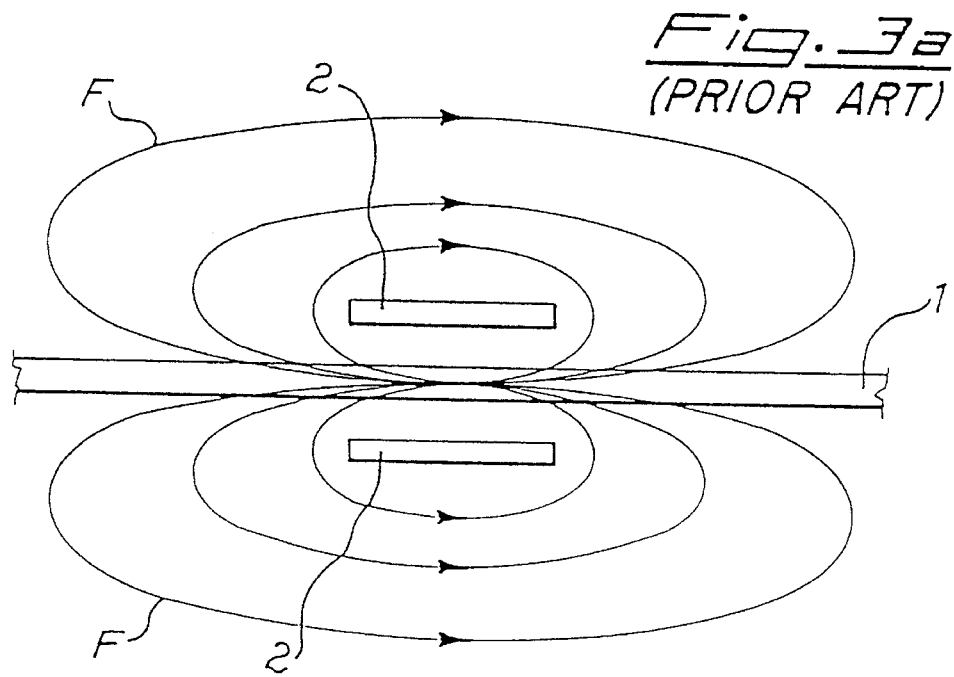
FIGS. 3a and 3b show respectively the magnetic flux path in a traditional inductor and the induced current path in the heated material.
Figure 3B:
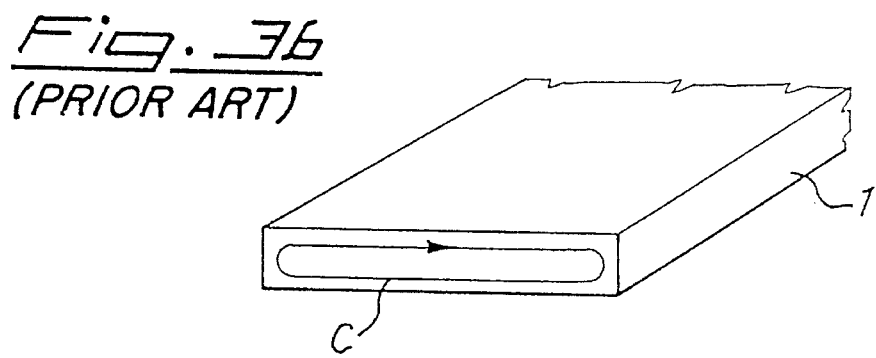

To better explain what is described above, with reference to FIGS. 3a, 3b, relating to the prior art, there can be observed how the magnetic flux, produced by a coil 2 shown in cross-section, while passing through the material 1 to be heated, closes substantially in the air and produces an induced current in material 1, with the direction illustrated by arrow C. At an early analytical study of flux paths, as theoretically shown in FIG. 3a, negligible values of the magnetic field are detected at a distance of 200 mm from the inductor. However, when examining the actual system, with the supporting structures having a $\mu_r$ higher than 1, as they are made of steel or in any case define closed rings, it is found that the flux is considerably deflected from these metal parts thus giving rise to power losses which may be estimated as of 20%.

In FIG. 4, schematically showing in cross section the flux concentrator 5 with a pair of steel irons, namely an upper one 7a and a lower one 7b, the magnetic flux F substantially closes at the inside thereof, so as to reduce to a minimum the losses due to eddy currents in the coil core. Obviously the magnetic sheet irons will have to be suitably dimensioned to this purpose, with a size choice which has to be the more careful, the higher is the frequency of magnetic field.

An example of embodiment, on experimental basis, is reported in the following for an induction furnace system according to the present invention, in order to show the higher efficiency obtained.

EXAMPLE

An induction furnace for thin slabs was prepared by placing in series four inductor assemblies as above described and shown in the drawings, with applied power of 925 kW on each of them and a working frequency of 6 kHz. The thin slab to be heated, made of Fe 37 steel, was sized 1330 mm in width and 25 mm in thickness. Temperature was detected by means of two termocouples, one of which located at the center of the slab and the second at 2 mm from its surface. By feeding forward the thin slab at a speed of 9 m/min, a temperature gradient of 83° C. has been experienced. Also by means of tests made previously, it was found that at this temperature the thermal losses due to radiation are equal to 17° C. Therefore the total net difference of temperature is of 100° C., that corresponds, for a value of 0.2 $Wh.Kg^{-1}.K^{-1}$ for the specific heat of the material, to an energy of $25 \times 1330 \times 7.85.10^{-6} \times 9000 \times 60 \times 0.2 \times 100°$ C.=2819 kWh. Power losses in the core were of 12 W, i.e. 1% of the total power.

Therefore an inductor efficiency may be calculated, as a ratio between applied power and power actually received by the slab: $\eta=2819/(925\times 4)=0.762$, again a value of about 0.6 which would have been obtained under the same conditions, but with two lateral flux concentrators of the above-mentioned prior published patent WO 90/14742 instead of the linear flux concentrator encircling each inductor according to the present invention.

Possible additions and/or modifications can be adopted into the above-described and illustrated embodiment of the improved induction furnace according to the present invention without exceeding the scope of the invention itself. It is clear that the number of coils or heating elements which in series form the furnace is not critical and may be chosen at will.

We claim:

1. An induction furnace for heating, at a homogenous temperature, flat steel products fed into the furnace in a continuous line in a predetermined feeding direction, the furnace comprising:

(a) a succession of heating assemblies, each assembly comprising refractory material and having:

(i) a narrow inductor coil fed by a separate frequency converter, the coil having a longitudinal orientation, the size of the coil in the feeding direction of the flat products having a finite size and being 350 mm or less, and (ii) a linear flux concentrator in proximity of the coil and extending along the longitudinal orientation of the coil, the flux concentrator having ends, an upper portion and a lower portion, the upper and lower portions being joined at each of the ends and establishing a central gap therebetween for the flat products to pass therethrough, the upper and lower portions each being formed as a packet of generally C-shaped magnetic sheet irons arranged side by side and directed at right angles to both the longitudinal orientation of the coil and a plane defined by the flat products to be heated, the upper and lower portions facing each other and housing the inductor coil in the gap; and (b) pairs of rollers placed between the heating assemblies for supporting and moving the flat products in the feeding direction.

2. An induction furnace for heating, at a homogenous temperature, flat steel products fed into the furnace in a continuous line in a predetermined feeding direction, the furnace comprising:

(a) a succession of heating assemblies, each assembly comprising refractory material and having:

(i) a narrow inductor coil fed by a separate frequency converter, the coil having a longitudinal orientation, the size of the coil in the feeding direction of the flat products having a finite size and being 350 mm or less, and (ii) a linear flux concentrator in proximity of the coil and extending along the longitudinal orientation of the coil, the flux concentrator having ends, an upper portion and a lower portion, the upper and lower portions being joined at each of the ends and establishing a central gap therebetween for the flat products to pass therethrough, the gap extending through the heating assembly in a direction transverse to the longitudinal orientation of the coil, the upper and lower portions each being formed as a packet of generally C-shaped magnetic sheet irons arranged side by side and directed at right angles to both the longitudinal orientation of the coil and a plane defined by the flat products to be heated, the upper and lower portions facing each other and housing the inductor coil in the gap; and (b) pairs of rollers placed between the heating assemblies for supporting and moving the flat products in the feeding direction.

3. An induction furnace for heating, at a homogenous temperature, flat steel products fed into the furnace in a continuous line in a predetermined feeding direction, the furnace comprising:

(a) a succession of heating assemblies, each assembly comprising refractory material and having:
   (i) a narrow inductor coil fed by a separate frequency converter, the coil having a longitudinal orientation and being oriented transverse to the feeding direction, the size of the coil in the feeding direction of the flat products having a finite size and being 350 mm or less, and
   (ii) a linear flux concentrator in proximity of the coil and extending along the longitudinal orientation of the coil, the flux concentrator having ends, an upper portion and a lower portion, the upper and lower portions being joined at each of the ends and establishing a central gap therebetween for the flat products to pass therethrough, the upper and lower portions each being formed as a packet of generally C-shaped magnetic sheet irons arranged side by side and directed at right angles to both the longitudinal orientation of the coil and a plane defined by the flat products to be heated, the upper and lower portions facing each other and housing the inductor coil in the gap; and
(b) pairs of rollers placed between the heating assemblies for supporting and moving the flat products in the feeding direction.

4. An induction furnace for heating, at a homogenous temperature, flat steel products fed into the furnace in a continuous line in a predetermined feeding direction, the furnace comprising:

(a) a succession of heating assemblies, each assembly comprising refractory material and having:
   (i) a narrow inductor coil fed by a separate frequency converter, the coil having a longitudinal orientation, the size of the coil in the feeding direction of the flat products having a finite size and being 350 mm or less, and
   (ii) a linear flux concentrator in proximity of the coil and extending along the longitudinal orientation of the coil, the flux concentrator having ends, an upper portion and a lower portion, the upper and lower portions being joined at each of the ends and establishing a central gap therebetween for the flat products to pass therethrough, the upper and lower portions each being formed as a packet of generally C-shaped magnetic sheet irons arranged side by side and directed at right angles to both the longitudinal orientation of the coil and a plane defined by the flat products to be heated, each of the sheet irons being oriented parallel to the feeding direction, the upper and lower portions facing each other and housing the inductor coil in the gap; and
(b) pairs of rollers placed between the heating assemblies for supporting and moving the flat products in the feeding direction.

\* \* \* \* \*